United States Patent
Gordon et al.

(10) Patent No.: US 6,444,252 B1
(45) Date of Patent: *Sep. 3, 2002

(54) METHODS OF PREPARATION OF GEL PRODUCTS FORTIFIED WITH CALCIUM

(75) Inventors: Daniel L. Gordon; Souyma Roy, both of Plymouth; Ann L. Ryan, Eden Prairie; Kelly S. Schwenn, Prior Lake, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/596,512

(22) Filed: Jun. 19, 2000

Related U.S. Application Data

(63) Continuation-in-part of application No. 09/197,214, filed on Nov. 20, 1998, now Pat. No. 6,077,557.

(51) Int. Cl.[7] ............................ A23L 1/05; A23L 1/072
(52) U.S. Cl. ..................... 426/573; 426/576; 426/577; 426/74; 426/639
(58) Field of Search ................. 426/573, 576, 426/577, 74, 271, 615, 639, 473

(56) References Cited

U.S. PATENT DOCUMENTS

| | | |
|---|---|---|
| 2,272,990 A | 2/1942 | Forkner et al. |
| 2,650,880 A | 9/1953 | Erickson |
| 2,855,315 A | 10/1958 | Perrozzi et al. |
| 4,267,197 A | 5/1981 | Sawhill |
| 4,515,822 A | 5/1985 | Kraig et al. |
| 4,542,033 A | 9/1985 | Agarwala |
| 4,722,847 A | 2/1988 | Heckert |
| 4,737,375 A | 4/1988 | Nakel et al. |
| 4,784,871 A | 11/1988 | Park |
| 4,786,510 A | 11/1988 | Nakel et al. |
| 4,830,862 A | 5/1989 | Braun et al. |
| 4,853,236 A | 8/1989 | Langler |
| 4,886,678 A | 12/1989 | Chiu et al. |
| 4,961,943 A | 10/1990 | Blanthorn et al. |
| 4,992,282 A | 2/1991 | Mehansho et al. |
| 5,084,296 A | 1/1992 | Lugay et al. |
| 5,186,965 A | 2/1993 | Fox et al. |
| 5,208,059 A | 5/1993 | Dubowik et al. |
| 5,364,643 A | 11/1994 | Morimoto et al. |
| 5,445,837 A | 8/1995 | Burkes et al. |
| 5,455,053 A | 10/1995 | Zimmermann et al. |
| 5,747,080 A | 5/1998 | Lemke et al. |
| 5,820,903 A | 10/1998 | Fleury et al. |
| 5,840,354 A | 11/1998 | Baumann et al. |
| 5,942,268 A | 8/1999 | Zimmermann et al. |
| 6,077,557 A * | 6/2000 | Gordan et al. .............. 426/573 |
| 6,123,016 A | 9/2000 | McGuire et al. |
| 6,165,531 A | 12/2000 | Harding et al. |

FOREIGN PATENT DOCUMENTS

| | | |
|---|---|---|
| EP | 244903 A | 11/1987 |
| GB | 1 564 452 | 4/1980 |
| GB | 2249934 A | 5/1992 |
| GB | 2329571 A | 3/1999 |
| RU | 2073985 C | 2/1997 |
| WO | WO 9319613 A | 10/1993 |

* cited by examiner

*Primary Examiner*—Keith Hendricks
(74) *Attorney, Agent, or Firm*—John A. O'Toole; Douglas J. Taylor; Everett G. Diederiks, Jr.

(57) ABSTRACT

Disclosed are improved, intermediate moisture sweetened gelled food compositions fortified with calcium supplied by calcium phosphate that is dispersed in an oil and/or fat. The gelled compositions comprise: A) about 55 to 85% by weight nutritive carbohydrate sweeteners; B) sufficient amounts of a gelling agent(s) to provide a gel strength of about 2–8 kg/cm$^2$; C) about 50 to 1500 mg/oz total calcium; and D) about 9 to 20% moisture, and E) about to 0.1% to 5% of an edible fatty triglyceride. Also disclosed are methods for the preparation of such fruit products involving forming a concentrated slurry of calcium phosphate having a particle size such that at least 90% are less than 150 μm dispersed in at least a portion of the oil and/or fat, forming a gellable blend and admixing the gellable composition with the slurry to form a gellable calcium fortified composition and forming into desired shaped and sized pieces.

34 Claims, 1 Drawing Sheet

METHODS OF PREPARATION OF GEL PRODUCTS FORTIFIED WITH CALCIUM

CROSS-REFERENCE TO RELATED APPLICATIONS

This application is a continuation-in-part of commonly assigned U.S. patent application Ser. No. 09/197,214 entitled "GEL PRODUCTS FORTIFIED WITH CALCIUM AND METHOD OF PREPARATION" filed on Nov. 20, 1998, now U.S. Pat. No. 6,077,557.

FIELD OF THE INVENTION

The present invention relates to food products and to their methods of preparation. More particularly, the present invention relates to gelled food products fortified with calcium and to their methods of preparation.

BACKGROUND OF THE INVENTION

The present invention provides an improvement in food products prepared by starch molding and to their methods of preparation. In particular, the present invention provides starch molded gelled food products fortified with insoluble calcium.

In particular, the present invention provides further improvements in the gelled food products and their methods of preparation taught in the parent application. In that application, a calcium slurry is prepared comprising calcium phosphate salts and propylene glycol and/or glycerine. This calcium bearing slurry is added to other materials such as sugars and fruit purees to form a calcium bearing gellable blend. The calcium bearing gellable blend is then further processed such as by forming that blend into shaped pieces and drying to form finished calcium fortified gelled food pieces.

The present improvement is directed towards an alternative to that calcium-in-propylene glycol and/or glycerine slurry. In the present invention, a calcium phosphate-in-liquid fat slurry can be used in full or partial substitution for the benefits of better flavor, better shelf life and possibly greater bioavailability of the calcium.

For adults, recent medical studies have indicated that a diet containing the U.S. recommended daily allowance (RDA) of calcium might be effective in preventing or mitigating osteoporosis, and also possibly high blood pressure and colon cancer. Calcium is also of particular nutritional value in growing children to support bone growth. There is therefore great public interest in the consumption of food products that will supply the recommended daily allowance of calcium.

Wholesome snacks prepared from sweetened intermediate moisture shelf stable fruit or "fruit snacks" herein have recently become popular food items. These compositions are sold in various physical forms and shapes such as: 1) in rolled sheet form; 2) in rolled strip form; 3) in string form mounted on a U-board; 4) soft center filled pieces, and 5) in gelled bite size pieces of various shapes or in gelled bite size piece form prepared by starch molding.

Generally, these products are prepared from wet mixtures of the various fruit materials and added ingredients that are dried to desired moisture contents. The dehydrated compositions are formed into articles of desired shapes and sizes. Within this general similarity, however, the particular methods of preparation, product formulations and apparatus used to prepare particular products vary considerably.

Particularly popular products are in rolled sheet form such as are sold under the Fruit Roll-Ups brand. Popular products in rolled strip form are sold under the Fruit By The Foot brand (see also, U.S. Pat. No. 5,455,053 entitled "Rolled Food Item" issued 10/3/95). Food products in string form mounted on a U-board are sold under the String Thing™ mark while other products in bite size pieces of various shapes are sold under various brands. (See, for example, commonly assigned U.S. Pat. No. 5,942,268 entitled "Embossed Shape Food Item" issued Aug. 24, 1999 to Zimmermann et al.)

These dried fruit products are especially popular with children, particularly as snack or convenience foods. Growing children, of course, have a particular need for calcium in their diet. Unfortunately, fruit snacks are not a good source of calcium. The typical calcium content of a fruit is only on the order of under 50 mg/oz (dry basis).

Thus, while fruit snacks are popular, it would be desirable if such fruit snacks were fortified with supplemental calcium to provide a significantly nutritionally enhanced product. By significantly nutritionally enhanced is meant a product having at least 10% of the current recommended daily allowance ("RDA") or at least 100 mg of calcium (including both the native and supplemental contributions) per 1 oz (wet basis) of fruit snack serving.

Adding an ingredient that supplies a soluble calcium ion can enhance the gelling properties of a variety of gelling agents, including pectin. Since fruit contains pectin, the prior art includes numerous teachings regarding the use of soluble calcium to adjust the texture properties of fruit materials. Jam and jelly making are two familiar examples. However, since the impact of soluble calcium or gel strength is typically strong even at low concentrations, the supplemental level is generally less than 500 PPM. Also, such fruit products typically have higher moisture contents than the present fruit snacks. Thus, typical calcium level manipulation teachings regarding texture control do not provide dried fruit compositions having the levels of calcium desired for nutritional fortification while also having desired texture properties.

Further complicating the difficulties of formulating calcium fortified food products is that calcium-containing materials have their own particular, frequently undesirable taste properties. Worse, calcium can also interact with other ingredients, particularly flavors, to reduce desired flavors or to generate undesired off flavors especially over extended times at room temperature storage.

Previous art attempts at providing fruit products that have enhanced calcium levels include commonly assigned U.S. Pat. No. 4,542,033 entitled "Sugar and Acid Infused Fruit Products and Processes Therefor" issued Sep. 17, 1985 to Agarwala. The '033 patent teaches the infusion of sugars, acids and soluble calcium salts into discrete fruit pieces with subsequent dehydration.

Similarly, the art includes numerous teachings directed towards forming a highly soluble complex of citric acid, malic acid and calcium. (See, for example, U.S. Pat. No. 5,186,965 entitled "Calcium Citrate Malate Composition"). While useful, such formulations require addition of expensive special ingredients or extensive processing to form the materials in situ. Also, such teachings are directed toward fluid products albeit concentrates in some instances.

Commonly assigned U.S. Ser. No. 08/867,785 entitled "Dried Fruit Products Fortified With Calcium and Method of Preparation" (filed Jun. 3, 1997, incorporated herein by reference) teaches methods by which dried fruit products can be made that are fortified with insoluble calcium. The methods therein described involve the post drying blending of insoluble calcium. Such methods are suitable for use for providing calcium fortified dried or intermediate moisture fruit products that are, for example, in the form of sheets or in rolled strip form.

While useful to provide calcium fortified fruit products of those particular forms, it would be desirable to similarly provide starch molded gelled bite size dried fruit products fortified with calcium, particularly those wherein the gel structuring agent is pectin. The present invention satisfies this need by providing methods for preparing such starch molded gelled bite size dried fruit products that are calcium fortified. In part, the present invention involves providing a gelable sweetened fruit slurry that includes an insoluble calcium ingredient.

It is a further object of the present invention to provide sweetened dried fruit products having improved organoleptic properties.

In particular, it is an object of the present invention to provide methods for preparing calcium fortified sweetened dried gelled fruit compositions.

Still another object of the present invention is to provide methods for prepared calcium fortified sweetened dried fruit products wherein the calcium is supplied by insoluble calcium salts such as calcium phosphates.

Still another object of the present invention is to provide fruit gel product fortified with insoluble calcium and their methods of preparation.

Still another object of the present invention is to provide gelled food products, particularly those that are fruit bearing, that are fortified to high levels of calcium that nonetheless exhibit good flavor both initially and over extended storage at room temperatures.

Still another objective is to provide food products fortified with calcium provided by calcium phosphate salts of potentially enhanced or greater bioavailability.

It has been surprisingly discovered that the above objectives can be realized and superior dried sweetened fruit provided by formulating compositions, comprising: nutritive carbohydrate sweeteners especially those provided by fruit solids, an acid setting pectin gelling agent, acidulants, high levels of insoluble calcium phosphate(s) of particular particle size, a soluble calcium sequestrant and moisture. The present invention further provides novel methods of preparation of such calcium fortified gel products involving the preacidification incorporation of the insoluble calcium source material in slurry form wherein at least a portion of the slurry includes a liquid fat and/or an oil as the carrier.

SUMMARY OF THE INVENTION

Figure 1:
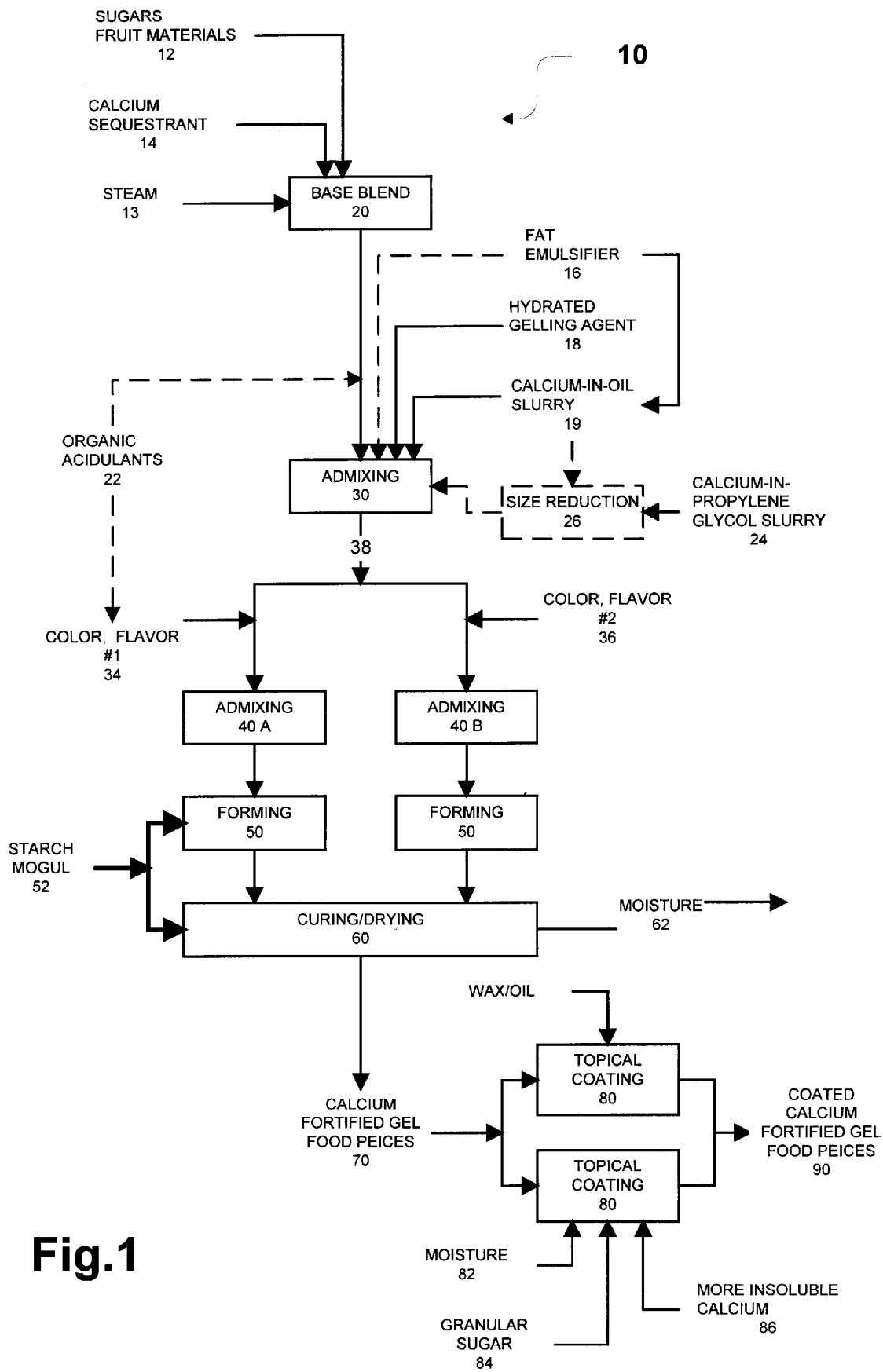
FIG. 1 is block flow diagram of a process according to a method aspect of the present invention.

In its product aspect, the present invention is directed towards gelled sweetened, dried products such as bite sized pieces comprising fruit solids, and a calcium phosphate salt in a quantity sufficient to bring the total calcium content of the composition to from about 50 to 1500 mg per 28.4g (1 oz) serving (wet basis) (0.15% to 5.5% by weight, wet basis). The products essentially include low levels of fat provided by including a slurry of calcium phosphate in a liquid fat and/or oil.

The calcium amounts include both the native level supplied by the fruit materials source as well as the supplemental added calcium.

The calcium is supplied by an insoluble calcium phosphate selected from the group consisting of tricalcium phosphate, dicalcium phosphate, and their hydrates, and mixtures thereof.

The calcium phosphate has a preferred particle size of less than 150 microns.

The gelled food products essentially comprise:

About 55% to 85% of sugar(s);

Sufficient amounts of a gel-structuring ingredient to provide gel strength of about 1–8 Kilogram force/cm$^2$ or more preferably, 1.5–4 Kg measured with a 0.4 cm diameter probe.

About 0.2 to 6% calcium provided from an insoluble calcium phosphate salt;

About 0.1% to 1% of a soluble calcium sequestering ingredient;

About 0.5 to 5% of edible lipids and

A moisture content of about 15 to 25%.

In its process aspect, the present invention resides in methods of preparing a gelled dried sweetened fruit product fortified with calcium such as prepared by starch molding. The process involves the pre-gelling addition of a source of insoluble calcium. The calcium phosphate has a preferred particle size of less than 150 microns.

The methods comprise the steps in sequence of:

Providing a slurry gel base comprising nutritive carbohydrate sweeteners especially fruit materials that contribute fruit solids, sufficient amounts of a gelling agent (such as pectin, gelatin, and/or starch) to provide a gel strength in the finished product of about 1 to 8 Kg/cm$^2$ force, an insoluble calcium phosphate of the requisite particle size to provide a total calcium content of about 50 to 1500 mg of calcium per 1 oz of product (0.15 to 5.5% by weight calcium) and moisture adding;

Adding sufficient amounts of an edible organic acidulant to the fruit base to provide a gellable fruit base having a pH ranging from about 3.0 to 5.5; to form a calcium fortified gellable base;

Forming the base calcium fortified fruit base into suitably sized and shaped individual pieces; and Curing the pieces to form calcium fortified gelled pieces.

In the preferred embodiment, calcium phosphate salt is admixed with an oil liquid carrier in a weight ratio of about 1:1 to about 1:8 to form slurry. The slurry is mixed with the cooked blend.

DETAILED DESCRIPTION OF THE INVENTION

The present invention provides improved, intermediate moisture gelled sweetened fruit products that are calcium fortified and that comprises fruit solids, calcium phosphate and moisture and further provides methods for preparing such fruit products. Each of these components as well as product properties, preparation and use are described in detail below.

Throughout the specification and claims, percentages are by weight and temperatures in degrees Centigrade unless otherwise indicated.

Sweeteners

A principal essential component of the present invention food products is one or more nutritive carbohydrate sweeteners or sugars. The present gelled products essentially comprise about 55% to about 80% dry weight basis of such nutritive carbohydrate sweeteners, preferably about 55% to about 70%, and for best results about 60% to about 65%. Such sugars not only provide taste and nutritional properties but also influence the texture and structure of the present products.

Nutritive carbohydrate sweeteners are well known in the art and the skilled artisan will have no difficulty in selecting particular ingredients for use herein as the nutritive carbohydrate sweetener component. Generally, however, the term "nutritive carbohydrate sweetening agent" is used herein to mean those typical purified sweetening agents conventionally used in food products. Of course, the present nutritive carbohydrate-sweetening agents are to be distinguished from non-nutritive carbohydrate high potency sweetening agents such as saccharine, cyclamate, and the like. Additionally, the present nutritive carbohydrate-sweetening agents are to be distinguished from such protein-based sweetening agents as aspartame, thaumatin, and monellin.

Suitable materials for use as nutritive carbohydrate sweetening agents are well known in the art. Examples of sweetening agents include both monosaccharide and disaccharide sugars such as sucrose, invert sugar, dextrose, lactose, honey, maltose, fructose, maple syrup and corn syrup or corn syrup solids. Preferred nutritive carbohydrate sweetening agents are those selected from the group consisting of sucrose, glucose, fructose, corn syrup solids, and honey. Highly preferred nutritive carbohydrate sweetening agents are those selected from the group consisting of sucrose, corn syrup solids, and fructose. Of course, mixtures of the above-noted materials are contemplated herein.

In a preferred embodiment, the ratio of monosaccharide to disaccharide sweeteners is controlled so as to minimize the development of unwanted properties in the finished food product over storage such as the development of crystals. To that end, the ratio can be and preferably does range from about 0.5:1 to about 1.8:1, and more preferably, about 0.7:1 to about 1.5:1.

In preferred embodiments, the gelled products herein are fruit products. In such preferred embodiments, the gelled products are further essentially characterized by having at least a portion of the nutritive carbohydrate sweeteners as being provided by or from fruit sources or fruit solids. The fruit solids can be derived from fruit purees prepared from whole fruit flesh or if such purees have been partially dehydrated, fruit paste. The term "puree" has been used in the art to refer to both heat treated, e.g., boiled and untreated food pulp. As used herein, however, "puree" is meant to refer both to heat and unheat-treated whole fruit pieces, which have been mechanically transformed into fluids. Thus, the present comminuted fruit material can be distinguished from discrete individual pieces of intact fruit flesh.

Both unseeded and, preferably, deseeded purees can be used. Fruit puree generally contains about 35 to 90% moisture. Other edible fruit portions, such as fruit pulp can also supply the fruit solids component. Fruit pulp is the material remaining after fruit juices have been removed from fruit puree. Additionally useful herein for supplying the fruit solids are various fruit juices whether single strength or concentrated.

Fruit materials from any fruit can be used herein. Examples of such fruits useful herein include apricot, pineapple, lemon, orange, peach, pear, lime, banana, grape, mango, apple, tomato, blackberry, plum, watermelon, blueberry, raspberry, strawberry, current, cherry, cranberry, and mixtures thereof. Preferred fruits are selected from the group consisting of apples, strawberries, cherries, pears, blueberries, raspberries, grapes, oranges and mixtures thereof. Most highly preferred for use herein are grapes, strawberries, pears, oranges and cherries.

Fresh fruit is, of course, useful for preparing the products herein. However, previously frozen fruit, canned fruit, partially dehydrated fruit or rehydrated fruit, as well as frozen juices, concentrates, nectars, powders or frozen juice pulps are also suitable for use herein. When frozen fruit is employed, e.g., "four plus one" strawberries, i.e., frozen strawberries with one quarter part by weight added sugar, only the fruit solids contribution is to be considered.

While the present invention is primarily directed towards fruit containing products, the skilled artisan will appreciate that the present invention is equivalently applicable to all edible plant solids, especially ordinary garden-variety vegetables. The sugars, flavors, acids, pectinaceous or cellulosic fibers and ash of which plant solids are typically comprised are intended to be included within the term edible plant solids. However, "edible plant solids" is not intended to include such starch fractions as wheat or other cereal flours nor oleaginous materials such soybean oil. That is, the present fruit solids can be wholly or partially replaced with equivalent amounts of ordinary garden vegetable solids. However, vegetable flavored products are not nearly as popular as those, which are fruit, flavored. However, certain vegetables, e.g., pumpkin, squash and carrot enjoys some popularity as novelty items.

Also useful herein are fruit juice solids especially from inexpensive fruit sources such as grape juice, apple juice, and pear juice. If present, such juice solids can constitute about 0.1 to about 70% of the finished fruit snack products herein.

In even more preferred embodiments, the present compositions essentially comprise from about 5 to 100% (dry weight basis) of the nutritive carbohydrate sweetener component of fruit or plant solids. That is, if 100g of a gelled product has a total sweetener component of 60% (wet basis), then in the preferred embodiment, at least 3 g thereof are provided from fruit solids. Better results in terms of natural flavor and color but at economical costs are obtained when the fruit solids are present at from about 5 to 25% of the sweetener component. Best results are obtained when the fruit solids are comprise about 5 to 15% of the nutritive carbohydrate sweetener component.

If desired, the present gelled products can additionally comprise supplemental high potency sweeteners such as saccharine, aspartame, thaumatin, potassium acetylsulfame, and mixtures thereof. Other suitable high potency sweeteners that become permitted for use or commercially available from time to time can also be used.

Gelling Agent

The present calcium fortified gelled food products further essentially comprise sufficient amounts of a gelling agent to provide the finished products with a gel strength at the desired moisture levels herein of about 1–8 $Kg/cm^2$ force.

Gel strength or hardness can be measured both directly and expressed as grams force and indirectly expressed as a viscosity. To measure hardness a Kramer single blade shear cell was used. In this test, the test piece is placed over a slot in the base of the test fixture. A shear blade is then driven down at a constant speed down through the test piece, and the blade continues into the slot of the base. The recorded measurement is the peak force as the blade cuts through the test piece. The force transducer that records the test force is calibrated using metric weights, so the measurement units reported are in kilograms-force. Useful for performing this test is any Universal Testing machine such as is available from Stevens, Instron or, prefereably from Stable Micro Systems (e.g., using its Model TA.HD Texture Analyzer) The gel hardness can also be alternatively measured using a standard Brookfield viscometer (Model RVDV) with a helipath stand and D-T-bar spindle. These technique measures the force required to cut through a gelled liquid. The D-T-bar spindle rotates at a set speed and is slowly lowered by the helipath stand into the sample. The Brookfield measures the torque required for the spindle to "cut" through the sample. The helical pattern traced by the spindle as it both rotates (5 RPM) and is lowered causes the spindle to always be cutting through undisturbed gel. The cutting force or torque reading on the viscometer is an empirical measure of gel strength.

Temperature is critical to obtaining an accurate viscosity reading and thus the samples are tempered to 70° to 75° F. (21° to 24° C.) prior to testing. Reported values are averaged over five readings taken at regular time intervals and are read directly from the instrument display. The Brookfield RVDV reading is reported as centipoise (cps). Typical gel strength reading for the gel described herein using the Brookfield method range between 100,000 to 300,000 cps, most preferred being 150,000 to 250,000 cps.

The art is replete with suitable gelling agents and the skilled artisan will have not difficulty in selecting suitable gelling agent(s) for use herein. Gelling agents, of course, are to be distinguished from mere thickening agents. Good results are obtained when all or at least a portion of the gelling agent is provided by a member is supplied by a member from the group consisting of gelatin, gellan gum, carbohydrate gel forming polymers (such as pectin, gel forming starches, dextran, agar, and mixtures thereof), and mixtures thereof and wherein the gel is free of alginates. Alginates are undesirable since the resulting product will not have desirable texture and will have less firmness. Among the gel forming carbohydrate polymer gel forming ingredients, pectin and gel forming starches are preferred. Preferred for use herein is gelatin or pectin.

The particular gelling agent(s) usage level depends upon a variety of factors such as the desired textural properties in the finished product, total solids level and type, strength of the gelling agents, whether pectin is provided by fruit materials included in the formulation and the amount of pectin so provided. Generally, however, good results are obtained when the total gelling agent (total of added and that provided by other ingredients such as the fruit solids) is present at levels ranging from about 1% to 10%.

In more preferred embodiments, the gelling agent is selected so as to form an irreversible gel. An irreversible gel is a gel that will set quickly, but will also tend to degrade in texture and strength under conditions of increased shear and/or temperature. Such an irreversible gel forming gel ingredient is preferred to provide good image detail during the molding operation.

In the most preferred embodiment, the gelling agent of choice is pectin; especially high methoxy pectin since such pectin sets at the preferred pH as described below.

It will be appreciated that the fruit solids, if employed, will additionally provide some native amount of pectin. Good results are obtained when the total pectin (including both the native pectin associated with the fruit solids and added pure pectin) content ranges from about 0.8% to about 2%.

A gel forming starch can be used alone or, preferably, is used in combination with gelatin or pectin as a supplemental gelling ingredient. Good results are obtained when the supplemental gel forming starch gelling ingredient is present at about 1% to 10% in addition to a pectin or gelatin content ranging from about 1% to 2%.

Moisture

The present gelled finished products essentially comprise about 13% to 25% moisture, preferably about 16% to 20% moisture. This moisture level in combination with the high level of sweeteners result in finished products having an "intermediate" water activity ("$A_w$") ranging from about 0.4 to 0.70.

Sequestrant

The present food compositions further essentially comprise sufficient amounts of a calcium sequestrant to bind up any substantially all available soluble calcium. Binding up any soluble calcium (such as provided by fruit ingredients, make-up water used in processing to form the present products, associated with the insoluble calcium ingredients as described below, etc.) is desirable to insure that the texture properties of the finished product remains constant or as nearly so as is possible, over extended storage time.

Calcium buffers are also well known in the confection art. Suitable soluble calcium or sequestrants to use are sodium or potassium citrates (e.g., trisodium citrate), phosphates, acetates, tartrates, malates, fumarates, adipates, ascorbates and mixtures thereof. Especially preferred for use herein as the sequestrant is a mixture of sodium citrate and sodium hexametaphosphate in a 15–20:1 weight ratio.

Generally, the amount of sequestrate will range from about 0.1 to 1% of the composition. Good results are obtained when the sequestrant(s) ranges for example, about 1.5% to 4% sodium citrate and about 0.2% to 0.5% and sodium hexametaphosphate. However, at excessive buffer levels, the aqueous gel solution will be over buffered and the finished product will have a soft texture if water with a low hardness level is used.

Suitable for use as a sequestrant herein is a material selected from the group consisting of sodium citrate, ethylenediaminetetraacetate ("EDTA"), sodium tripolyphosphate, and mixtures thereof. Preferred sequestrants are selected from the group consisting of sodium tripolyphosphate and mixtures thereof. Good results are obtained when the sequestrant is present at about 0.05% to 0.30%.

Calcium Phosphate Salt

The present fruit snack compositions and products fabricated therefrom essentially further comprise an insoluble calcium salt of defined particle size in an amount effective to provide the desired calcium enrichment. Good results are obtained when the present fruit snack compositions and products contain about 50 to 1500 mg calcium per one oz (0.15 to 5.5%). Better results are obtained when the calcium is present at levels of about 90 to 500 mg/oz (wet basis) of product (0.7 to 4.2%). For best results, the total calcium present ranges from about 90 to 200 mg per ounce (0.7 to 1.05%) of finished fruit product. Excessive calcium fortification is to be avoided in part because the finished product can exhibit an undesirable sticky and chalky texture somewhat like taffy.

Soluble calcium salts typically are expensive and contain low weight percentages of calcium. While calcium chloride is an exception to this generalization, addition of significant calcium levels supplied by calcium chloride impart an unacceptable salty and bitter flavor to dried sweetened fruit products.

Useful herein as the source of supplemental calcium is calcium phosphate. Calcium phosphate is generally available as a monobasic ($CaH_4(PO_4)_2 \cdot H_2O$), dibasic ($CaHPO_4 \cdot 2H_2O$) or tribasic ($Ca_3(PO_4)_2$) salts. Preferred for use herein is tricalcium phosphate, $Ca_3(PO_4)_2$, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is commercially available in food chemicals codex grade from Monsanto or Rhone Poulenc, having the general formula $3Ca_3(PO_4)_2.Ca(OH)_2$. This product provides an assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also commercially available from Stauffer Chemicals in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Phosphate salts are a preferred source of calcium, not only because of their acid solubility and weight ratios, but also because they are available commercially as a precipitate from whey, a natural dairy product.

The skilled artisan will appreciate that while the present calcium phosphate salts are characterized herein as insoluble, of course, some small percentage will dissolve in water depending in part upon the temperature and pH. However, at the concentrations of calcium salt used both in the slurry and the dried fruit composition products herein, the great percentage is in a solid state.

While not wishing to be bound by the proposed theory, it is speculated herein that the taste and taste stability advantages of the present invention reside in part due to the relatively inert or unreactive nature of the insoluble calcium phosphate salts selected. These salts by being inert not only do not form complexes such as soluble calcium source materials but also are relatively unreactive to the oil soluble flavors selected for use herein.

Unfortunately, other calcium salts that might otherwise be thought as useful but cannot be employed for one reason or another include, calcium ascorbate (bad flavor), calcium citrate (creates a chalky product and imparts a bad after taste), calcium carbonate (too effervescent and imparts a bad off-flavor), calcium gluconate (too expensive), calcium lactate (bad flavor), calcium chloride (bitter flavor) and calcium sulfate (too strongly flavored). In preferred embodiments, the present products are substantially free (>0.2%) of such calcium materials.

Fat

Certain embodiments additionally can comprise a fat (oil and/or solid) component and the improved embodiment does comprise fat. The fat component additionally affects the eating qualities of the present compositions. Inclusion of fat increases the shortness of the texture as well as reduces modestly the stickiness of the composition to the consumer's teeth. The fat ingredient can also assist in minimizing interaction between any oil soluble flavors included and the insoluble calcium ingredient.

The fat can comprise preferably about 0.1 to 8%, more preferably 0.5 to 5% and for best results about 1% to about 2% of the composition. Useful herein are fats and oils that are conventional for use in food products, especially for confections. Both conventional fatty triglyceridic materials such as oils and solid fats can be used herein as well as blends of fats and oils. Also useful herein are fats, especially partially hydrogenated oils such as canola, corn oil, safflower, soybean, coconut, cottonseed or fractionated oils, all of which have melting points above room temperature. Less preferred are animal derived fats. Employment of such particular fats is preferred due to a reduced tendency of the glyceridic component to grease out of the present fruit compositions. In other preferred variations, the oils are selected to have and provide higher levels of medium chain tryglycerides. While not proven and not universally accepted, it is believed by many in the art that the presence of medium chain tryglycerides benificially enhances the bioavailability of calium phosphate salts possibly by increasing calium absorption. One suitable oil that provides high levels of such medium chain tryglycerides is canola oil.

In preferred embodiments, the fat component can additionally include lecithin and other emulsifiers, e.g., acetylated mon-glycerides, if desired.

Oil Soluble Flavors

Optionally, the present gel food products can further additionally include effective amounts of oil soluble flavor (s). Selection of oil soluble flavors to the exclusion of conventional water-soluble flavors has been found important to minimization of undesirable adverse interaction between the flavor and the calcium. Such interaction can lead to the development of undesirable flavors as well as the loss of intensity of desired flavors. Indeed, the present gel products are preferably free of added water-soluble, or alcohol, propylene glycol or glycerine-based flavors. (The last two may be in combination with oil-based flavors.)

If present, such oil soluble flavors can comprise effective-amounts of such oil soluble flavors to provide desired flavor levels. Good results are generally obtained when the oil soluble flavors are present at from about 0.01% to about 2% of the finished products.

Additional Ingredients

The present food compositions can optionally contain a variety of additional ingredients suitable for rendering such products more organoleptically acceptable, more nutritious and/or more storage stable. While not essential to the present food compositions, such optional components include fiber materials, high potency sweeteners, colors, coloring agents, vitamins, preservatives (e.g., sodium bisulfite), emulsifiers, calcium carriers (e.g., propylene glycol), dairy products (e.g., non fat dairy solids), and the like. Of course, highly preferred for use herein are "natural" ingredient additives.

Acidulant

In preferred embodiments, the present compositions further essentially comprise sufficient amounts of an edible organic acid or acidulant to provide the gel with a pH of about 3.0 to 5.5, preferably about 3.2 to 4.5, and for best results about 3.2 to 3.6. The particular pH selected from within this pH range depends in part upon the type of gelling ingredient employed as well as the organoleptic attributes desired. For example, in the preferred embodiment that contains high levels of fruit solids and wherein the gelling agent is a high methoxy pectin, the preferred pH range varies from about 3.2 to about 3.5.

A variety of edible organic acids can be used to adjust the pH of the present invention as well as to control the taste and tartness of the present products. Especially suitable for use herein are citric acid, tartaric acid, malic acid, lactic acid, fumaric acid, ascorbic acid and mixtures thereof.

Bulking Ingredient

In one highly preferred embodiment, the gel formulation includes a bodying agent. The bodying agent can serve to add both bulk and body and, most importantly, provide additional solids so as to enable the realization of gel compositions having moisture contents within the essential ranges given herein.

Especially useful herein as bodying agents are dextrins especially maltodextrins. Generally, the maltodextrin component is present at from about 0.1% by weight to about 25% by weight. Superior results in terms of sweetness balancing and prevention of crystallization are obtained when the maltodextrin component is present in the compositions at from about 3 to 10% by weight. For best results, however, the maltodextrin component should be employed at from about 3% to 5% of the dried gel composition.

The bland maltodextrin provides minimal sweetness. Thus, low D.E. (dextrose equivalent) maltodextrin should be employed. By low D.E. is meant a maltodextrin with a D.E. of less than about 20. Low D.E. maltodextrins are commercially available and the skilled artisan will have no difficulty in selecting suitable maltodextrins for use herein. Generally, however, maltodextrins can be obtained by dextrinization of starch, particularly cornstarch. Enzymatic hydrolyzates, optionally under acidic conditions, of the starch can be used; the conditions are so mild that negligible repolymerization occurs. This is in contrast to dextrins that typically are made from starch by hydrolyzates and repolymerization by using high temperature and pressure by dry heating or roasting of the starches (pyro dextrins). Such materials are well known (see, for example, U.S. Pat. No. 3,586,513, issued Jun. 22, 1972 to H. E. Horn et al. and U.S. Pat. No. 4,335,155, issued Jun. 15, 1982 to Blake et al.), and are widely available in the food industry.

Another class of materials useful herein as bodying or bulking agents is hydrogenated starch hydrolyzates that are commonly referred to as "polydextrose." Polydextrose provides an added advantage of being a low calorie material, i.e., having about one calorie per gram as opposed to about four calories per gram for most carbohydrates.

In still another variation, the present products can further comprise about 0.15 to 10% inulin, preferably about 0.5% to 5%. Inulin or equaly suitable like frusto oligo saccharides ("FOS") ingredients provide the benefits of soluble fiber without the adverse organoleptic or allergin features of such other soluble fiber materials such as oat bran, psyllium, beta glucan, and guar gum. Moreover, it is believed that inulin and/or FOS materials facilitates the absorption of calcium when provided in the form of calium phosphate salts. It is an advantage herein that inulin and FOS materials behave in a manner similar to sugars which allows for ease of use and incorporation. Thus, inulin can conveniently be added to fruit and sugars blend 12. Also, inulin's bland flavor makes inulin particularly suitable for use in children's products since chilren are notoriously sensitive to off flavors. Morever, it is believed that there is a synergistic effect when both inulin and medium chain tryglycerides are both present on the absorption of calcium from calcium phosphate salts.

Since the target consumers for the present calcium fortified fruit gel food products are children, especially young children, the present products are desirably free of alcohol. It will be appreciated that trace amounts of alcohol may be present such as provided by the flavor component. Thus, alcohol free products herein will have less than 0.1% alcohol.

The finished products are formed into suitably sized and shaped pieces. In a preferred embodiment, the pieces are bite sized ranging from about 1 to 8 g each. The pieces can, if desired, be imparted with a particular shape such as an animal or vehicle. The pieces can be of all one color or portions can be of additional colors.

In certain embodiments, the pieces are provided having a topical coating. In one variation, the topical coating can be of crystalline or granulated sucrose to provide a "sugared" confection piece. In another variation, the topical coating of a lipid (such as oil or oil/wax blend) can be applied to provide a shinny or glossy finish. In still another variation, the topical coating can be in the form of a hard sugar shell. In still another variation, the topical coating can additionally include additional flavor, colors, preservatives, vitamins, and minerals. In one variation, for example, additional calcium phosphate salt is admixed with granular sugar to provide sugared confections that provides additional calcium fortification.

Generally, the weight ratio of base piece to topical coating ranges from about 10:1 to about 1000:1.

METHOD OF PREPARATION

Referring now to the drawing, in its method aspect, the present invention provides methods 10 for preparing the present calcium fortified gel food products. The present methods first essentially comprise the step of providing a gel forming base blend 20 of the base constituents. The base constituents include the sugars 12 (including any fruit based ingredients), calcium sequestrant 14, lipid (such as oil or fat) 16, gelling agent(s) 18, and insoluble calcium phosphate salt 19.

Conventional methods and techniques can be used to practice step 20. The blend is a homogeneous mass and not in the form of discrete pieces. Typically, a base blend is prepared comprising about 70° to 86° Brix, preferably about 75 to 84% solids, and for best results about 80 to 82% solids. The base blend can be prepared in a continuous process, such as in a twin screw extruder, batch or semi-continuous processes. In more preferred embodiments, the base blend 20 is characterized by a viscous but fluid consistency immediately prior to the described forming step, e.g., having a viscosity of about 15,000 to 50,000 cps. preferably about 18,000 to 22,000 cps. Such a viscous yet fluid consistency facilitates forming the blend into pieces without forming trailing edges or other shape imperfections.

In preferred embodiments, the base blend is heated to 76.6 to 87.7° C. (170 to 200° F.), preferably 79.4 to 85° C. (175 to 195° F.), and for best results about 82.2° C. (180° F.) and held for 3 min to 2 hours prior to the flavor/color admixture step. Such heating is especially helpful to fully hydrate any gelling agents such as starch.

In certain preferred embodiments, especially for batch or semi-continuous process, step 20 can comprise the sub-step of providing an aqueous premix of dissolved sugar ingredients (including any fruit ingredients), bulking agents, preservatives, buffers, inulin and/or other FOS materials and optionally all or a portion of any starch gelling agents. This aqueous premix can be heated or cooked such as with steam 13 to temperatures 200–350° F. (step 30) Such units as steam injection with back pressure valve or a direct cook system can be employed to reach such temperatures.

Step 30 can also include the substep of providing fat in liquid form optionally admixed with an emulsifier. For example, fat that is normally solid at room temperature can be heated to above its melting temperature to provide a fluid or liquid fat. Good results are obtained when the fat is heated to about 120° to 160° F. The liquid fat can be admixed with an emulsifier such as lecithin. Good results are obtained when the ratio of fat to lecithin (or other emulsifiers) ranges from about 5:1 to about 20:1, preferably about 10:1. The fat can also be mixed with or substituted with an oil especially canola oil which is a good source of medium chain tryglycerides.

Step 20 can further include a substep of providing an insoluble calcium phosphate salt slurry 19 by mixing the calcium phosphate with a non aqueous liquid carrier, preferably all or at least a portion of the fat. If a fat that is normally solid at room temperature is selected for use, then the fat is first heated above its melting point and maintained at temperatures hot enough to maintain as a fluid even after the calcium phosphate salt is added. If an oil is selected then, the oil can be but is not necessarily heated. If desired, all of the added calcium phosphate ingredient(s) can be combined with a portion of the oil and/or fat and added to the base blend 20 to form a calcium fortified gel blend. Also, if desired, a portion of the fat can be added separately. The fat carrier can be and preferably does contain an emulsifier to facilitate the disperion of the calcium phosphate in the fat slurry. Also, the fat provides a convenient means for evenly adding any included emulsifier. The weight ratio of calcium phosphate to oil in the slurry can range from about 1:1 to about 1:10, more preferably from 1:2 to about 1:3. At higher levels of calcium, the slurry can become pasty and thus difficult to pump or otherwise handle. At lower calcium levels, more fat can be added to the composition than might be desired.

In other embodiments, a second or supplemental slurry 24 can be also be provided wherein the liquid carrier comprises a non-aqueous water soluble carrier. Non-aqueous carriers provide an advantage since they do not add back moisture to the dried fruit. Excessive moisture addition can result in product instability. Preferred for use herein for the non-aqueous carrier is an ingredient selected from the group consisting of propylene glycol, glycerin and mixtures thereof. For example, a first essential fat based calcium slurry can be used to supply about ½ of the desired supplemental calcium, e.g., tricalcium phosphate. This calcium-in-fat slurry is then added to the base blend 20. A supplemental second blend wherein the carrier comprises propylene glycol and/or glycerin can also be used to provide the other ½ of the calcium material whether the same or a different material, e.g., dicalcium phosphate.

Generally, the slurry comprises the maximum feasible amount of calcium phosphate so as to minimize carrier addition to the dried fruit composition. Good results are obtained when the slurry comprises about 10 to 70% calcium phosphate, preferably 25 to 509, and about 30 to 90% carrier, preferably about 50 to 75% carrier so as to form an easily pumpable slurry. For best results, a 25:75 mixture of calcium phosphate and liquid carrier mixture is used as the slurry. In a less preferred variation, the tricalcium phosphate ("TCP") is added as a simple dry material without a carrier. In this embodiment, the TCP is added as a fine powder.

In more preferred embodiments, the calcium slurry is added to a cooked aqueous premix or blend so as to avoid exposure of the blend with the insoluble calcium for extended times at elevated temperatures. This practice minimizes undesirable adverse reactions that can lead to off-flavors.

In a less preferred embodiment, a portion of the calcium is provided wherein the carrier is water. The present calcium phosphate materials are highly alkaline, especially when dispersed in water. In order to avoid altering the pH of the finished fruit products when the calcium phosphate is admixed and avoid an impact on the taste of the products, it is important to "adjust" the aqueous calcium phosphate slurry. The pH is brought to the approximate acidity of the dried fruit composition being fortified by addition of the calcium. It is also important to avoid over acidifying the calcium phosphate. Thus, the pH should be within a few tenths of a pH of the dried fruit composition.

Since the pH of the gel finished products in the preferred fruit containing form generally will range from about 3.0 to 5.5, good results are generally obtained when the aqueous slurry pH ranges from about 3.2 to 4.6, preferably about 3.2 to 3.6. The preferred pH of the calcium slurry is at the pH of the dried fruit composition or below.

The slurry pH is adjusted to particular values within the above range by addition of an acid or acidulant. Useful herein as the acidulant are adipic, citric acid, fumaric, malic acid, and mixtures thereof. Preferred for use herein as an acidulant is citric acid. When in the preferred form the slurry is free of water, then sufficient amounts of edible organic or mineral acid is added to the wet fruit blend before drying such that the final product is within the desired pH range after addition of the calcium phosphate.

Most importantly, the calcium phosphate has a particle size such that 90% has a particle size of less than 150 microns ("$\mu$m"), that is, a fine powder. Having a calcium phosphate being of sufficiently reduced particle size is to avoiding a "grittiness" organoleptic attribute in the finished dried fruit composition.

A useful technique for ensuring that the calcium phosphate is of the requisite particle size in small-scale production is to screen a calcium phosphate starting material. For example, a maximum of 0.5% on a #100 U.S. standard sieve and a minimum of 95% through a #100 U.S. standard sieve is preferred (wet sieve method).

Another technique is to employ a supplemental size reduction step 26 (shown in FIG. 1 with a dashed/optional line) after calcium slurry preparation but prior to admixture 30 with the base blend 20. Suitable supplemental size reduction techniques include, for example, passing the slurry through a colloidal mill, passing the slurry through mesh screens/strainers, using a high speed shear impeller in the blender in which the slurry is prepared.

Preferably, the size reduction step results in a slurry wherein the calcium salt has mean particle size of 100 $\mu$m and for best results a mean particle size of less than 50 $\mu$m ("50 $\mu$m>").

When an aqueous carrier is employed, the slurry makeup can include a heating substep with vigorous agitation to insure hydration and/or suspension of the insoluble calcium salt.

All or part of the calcium sequestrant can optionally be added to the sugars preblend 12 or directly into the cooked base blend 20 or a portion into each.

Step 30 can further comprise a substep of providing a hydrated gelling agent dispersed in an aqueous carrier. For example, pectin can be dispersed into water and heated to about 170° F. to about 200° F. Good results are obtained when the gelling agent in the aqueous carrier comprises about 5% to 12%.

It will be appreciated that these substeps can be performed simultaneously as well as in various order combinations.

The present methods can further comprise the step 30 of admixing sufficient amounts of edible organic acidulates to provide a pH to the base blend of about 3.0 to 5.5 to provide an acidified gellable or gel forming base blend. When in the preferred embodiment, a high methoxyl pectin is used as the gelling agent, sufficient amounts of acidulant are admixed to provide the base blend with a pH ranging from about 3.2 to about 3.6. Conveniently, an aqueous dispersion of the acidulant(s) can be prepared comprising about 25 to 50% water. The moisture content of the base blend and acidulant solution is controlled such that after blending, the acidified base blend is of desired moisture content levels.

If desired, the acidified gel forming base blend can then be divided into a plurality of substreams. If desired, supplemental colors and flavors can be admixed into the acidified base blend, preferably after cooling to avoid extended exposure of the sensitive flavor materials to elevated temperatures, for color and flavor manipulation of the fruit composition. Since the calcium phosphate salt is white and of fine size, a colorant is preferred for use to mask the white color of the calcium phosphate salt. A color and/or flavor 34 can be admixed with a first substream of acidified base blend 40A while a second favor/color blend 36 can be admixed with a second substream of acidified base blend 40B.

In preferred variations, the acidified base gel forming blend is allowed to cool to a temperature of about 180° F. to about 210° F. proximate to the flavor and color admixture step.

In certain embodiments, the fruit material is quite bland and/or lacks a strong color, e.g., when white grape puree solids and/or pear juice supply the fruit source. If desired, the acidified base blend can be partitioned into individual substreams to which a separate color and/or flavor can be added. Thus, it is an advantage of this embodiment that from a single drying apparatus, a plurality or multiplicity of differently colored or flavored products can be prepared from a single homogeneous wet blend batch or supply.

Any suitable technique for uniformly blending the acidified gel forming base blend with flavor and color can be employed. Preferred for use herein for practicing the admixing is to employ in-line static mixers since the addition is accomplished with minimal shear being imparted.

Thereafter, the calcium fortified sweetened gel forming base blend composition can be fabricated into suitably sized and shaped individual pieces to form the present calcium fortified low moisture gelled snack products herein.

Conveniently, the well-known starch mold casting techniques can be used to practice the piece-forming step. Starch molding is often referred to in the trade as the Mogul system 52. Generally, the starch mold casting process involves the steps of forming the calcium fortified gellable base blend 38 into pieces 50 such as depositing into a plurality of molds or depressions formed into starch beds. During this step, importantly the calcium fortified gellable base blend 38 is in the form of a viscous fluid or plastic mass. The individual pieces are then allowed to cure 60 and, if needed, to dry to form individual gelled pieces. The pieces are removed from the starch molds such as by scalping. The Mogul system further involves recovery and reuse of the starch.

For "high moisture" gellable base blends 38, e.g., having a solids concentration of about 75° Brix to 82° Brix curing and drying times typically range from about 12 to 48 hours. Moisture reduction is modest. Typically, the pieces lose about 1% to 4% moisture during the curing/drying step 60. Drying temperatures are typically 60–150° F. For those low moisture gellable base blend 38 variations requiring little or no moisture removal, i.e., above 83° Brix, the duration of the curing step 60 can be much shorter even less than one hour. In these embodiments, the curing step can be practiced using the starch mogul process or employing other suitable molding techiques, e.g., in silicone based fixed shape molds.

As a result of curing in such starch molds, the finished pieces can acquire modest amount of additional starch such as about 1% to about 5% topical starch.

The pieces so formed can range in size from about 2 to 10 g, preferably about 1 to 5 g. In preferred embodiments, the gel pieces are formed into shapes having an ornamental configuration such as geometric shapes or shapes of animal or vehicles.

The individually shaped pieces can then be subsequently packaged in conventional manner. Especially useful are moisture sealed pouches fabricated from flexible film packaging impermeable flexible holding about 5 to 15 individual pieces collectively weighing about 25 to 50 g.

The finished products are soft, pliable products of both good flavor and eating quality. The products also provide exceptional nutritional properties in terms of sources of calcium. The products exhibit good initial flavor characteristics as well as prolonged resistance to flavor degradation at room temperature storage. The food products so formed are characterized by being nutritious, wholesome snacks and being fortified with high levels of calcium. The finished products have a preferred water activity ("$A_w$") ranging from about 0.5 to 0.6 and moisture content of 15 to 25%, preferably about 18 to 22%.

In further variations of the present invention, the gel food pieces can be provided with a topical coating. The methods of preparation 10 can further comprise a step of applying a topical coating 80. In one variation, the topical coating application step can involve applying a coating comprising a liquid oil optionally admixed with a wax to provide coated finished calcium fortified food pieces having a desirable shiny appearance. A blend of liquid oil and paraffin in a weight ratio of about 5:1 to about 15:1 is heated to a temperature of about 110° F. to about 140° F. The oil/wax blend is applied in an enrober in a weight ratio of gel food pieces to oil/wax coating of about 100:1 to about 1000:1.

In another variation, the topical coating can involve applying (with moisture 82) a granular sugar coating 84 to form a "sugared" coating to provide a "sugared" type coated gel food piece that is calcium fortified. In still other variations, the sugared coating can additionally additional insoluble calcium salts 86. In still other variations, the coating step can involve a panning operation to provide a hard shell or candy coating. The weight ratio (dry basis) of gel food piece to coating ranges from about 10:1 to about 100:1, preferably about 15:1 to about 50:1.

The coated calcium fortified gel food products so prepared can be conventionally packaged and distributed.

The present invention is illustrated by the following:

EXAMPLE 1

A fruit product of the present invention is prepared from the following formulation:

| Ingredient | Weight % |
| --- | --- |
| Grape Concentrate | 15.00 |
| Corn syrup | 30.00 |
| Sucrose | 25.00 |
| Corn Starch | 6.00 |
| Pectin | 1.50 |
| Canola oil | 3.50 |
| Lecithin | 0.35 |
| Citric acid | 1.30 |
| Tricalcium phosphate | 1.50 |
| Sodium hexametaphosphate | 0.10 |
| Color/flavorings | 0.10 |
| Water | 15.65 |
|  | 100.00% |

Twenty Kilograms of corn syrup and fruit solids are blended together. Thereafter, the cornstarch and sucrose are mixed into the fruit blend/corn syrup blend. The wet mixture has moisture content of about 25%.

The nutritive carbohydrate content is about 60%. The ratio of mono- to di-saccharide is about 1.4:1.

The wet blend is then preheated in a kettle to about 82.2° C. (180° F.). Immediately thereafter, the wet mixture is cooked using steam injection or vacuum cooking at 230–350° F. to a moisture content of about 20% to form a par-dried sweetened fruit blend. A pectin water blend is prepared and heated to 180° F. to hydrate the pectin. This blend is added to the final cooked blend. Separately, slurry was prepared of 0.67 kg tricalcium phosphate and 1.73 kg canola oil. The tricalcium phosphate is screened through a #100 U.S. standard sieve to ensure a particle size of less than 150 microns. The canola oil is heated to about 110° F. and then admixed with the tricalcium phosphate to form the slurry blend.

Acid is added to set the pectin. Finally, the flavorings and colorants are added.

Thereafter, the calcium fortified par-dried sweetened fruit composition is formed into finished gelled pieces using a starch molding technique. Small portions of the gellable calcium fortified composition are deposited into trays of starch into which impressions of the desired piece definition have been pressed.

The trays of deposited fruit slurry are allowed to dry for a period of 12 to 48 hours to the final desired moisture of 18%.

EXAMPLE 2

A fruit product of the present invention is prepared from the following formulation:

| Ingredient | Weight % |
| --- | --- |
| Pear Juice concentrate | 10.00 |
| Sucrose | 37.00 |
| Corn Syrup | 25.00 |
| Cornstarch | 6.00 |
| Pectin | 1.00 |
| Tricalcium phosphate | 2.00 |
| Citric Acid | 1.00 |
| Propylene glycol | 1.00 |
| Dicalcium phosphate | 0.90 |
| Sucrose fine granulation | 1.00 |
| Natural and artificial flavor | 0.10 |
| Water | 15.00 |
| | 100.00% |

The total nutritive carbohydrate concentration is about 65%. The ratio of mono- to di-saccharides is about 0.78:1.

A blend of 120 lbs. of the above ingredients except for dicalcium phosphate and the fine granulation of sucrose was made in a similar manner to that in Example 1. After curing the product is removed from the starch. The food product is then coated with a preblend of tricalcium phosphate and sucrose-fine granulation.

What is claimed is:

1. A method for preparing a gelled confection fortified with calcium, comprising the steps of:
   providing a gel forming base blend comprising:
   1. about 55 to 80% of the blend (wet basis) of sugars;
   2. about 1 to 5% of a gel forming structuring agent;
   3. a moisture content of about 13 to 25%;
   4. about. 0.05 to 1% of a soluble calcium sequestering agent;
   5. sufficient amounts of an insoluble calcium salt having a particle size such that at least 90% has a particle size of less than 150 microns to provide the base blend with a total calcium content to bring the total calcium content of the composition to from about 0.6% to 5.5% by weight (wet basis); and
   6. about 0.5% to 50/% of fat;
   admixing sufficient amounts of an edible organic acidulant to the base blend to provide a gellable fruit base having a pH ranging from about 3.2 to 5.5 to form an acidic calcium fortified gellable base;
   forming the acidic calcium fortified base blend into sized and shaped individual pieces; and
   curing the pieces to form acidic calcium fortified gelled confection pieces.

2. The method of claim 1 wherein the base blend additionally comprises an effective amount of oil soluble flavor or color.

3. The method of claim 2 wherein at least a portion of the nutritive carbohydrate sweeteners are provided by fruit solids provided by fruit juice, fruit juice powders, fruit purees, fruit nectars, fruit pulp, concentrated fruit juice, or mixtures thereof.

4. The method of claim 3 wherein the gelled confection additionally comprises about 0.1% to 10% starch.

5. The method of claim 4 wherein at least a portion of the gelling agent is supplied by a member selected from the group consisting of agar, gelatin, gellan gum, pectin and mixtures thereof.

6. The method of claim 5 wherein the gel forming base blend comprises an irreversible gel forming hydrophilic colloid.

7. The method of claim 6 wherein at least a portion of the irreversible gel forming the hydrophilic colloid is pectin.

8. The method of claim 7 wherein the gelled confection pieces have a weight ratio of mono-saccharides to di-saccharides ranges from about 0.5:1 to about 1.8:1.

9. The method of claim 8 wherein the acidic gel forming base blend comprises sufficient amounts of edible organic acid to provide a pH of about 3.2 to 3.5 and wherein the base blend is free of calcium carbonate.

10. The method of claim 9 wherein the gelled confection contains less than 0.1% ethanol.

11. The method of claim 10 wherein at least a portion of the pectin is a high methoxy pectin.

12. The method of claim 11 wherein the gel forming base blend is homogeneous.

13. The method of claim 12 additionally comprising the step of adding to the base blend or acidic base blend about 1% to 15% of food particulates having a size of 0.2 to 1 cm.

14. The method of claim 12 wherein the insoluble calcium salt is supplied by a calcium selected from the group consisting of monobasic, dibasic or tribasic calcium phosphate salts, their hydrates and mixtures thereof.

15. The method of claim 14 wherein at least a portion of the calcium is supplied by tricalcium phosphate.

16. The method of claim 2 wherein at least a portion of the gelling agent is gelatin.

17. The method of claim 14 wherein the oil soluble flavors are present at about 0.05% to 1%.

18. The method of claim 1 wherein the base blend providing step includes the substep of:
   forming a liquid slurry comprising about 10 to 50% calcium phosphate and the balance at least a portion of the fat.

19. The method of claim 1 wherein forming step is practiced by depositing the acidic gellable base blend into a plurality of molds are allowing to set to form a plurality of gelled confection pieces.

20. The method of claim 19 wherein the curing step involves drying the gelled confection pieces to provide the gelled confection with a moisture content of about 18 to 22%.

21. The method of claim 1, additionally comprising the step of:

applying a topical coating to the gelled confections to provide gelled confections having a topical coating.

22. The method of claim 21 wherein the topical applying step includes applying a granulated sugar to the gelled confection pieces to provide sugared calcium fortified gelled confection pieces.

23. The method of claim 21 wherein the topical applying step includes applying oil to the gelled confection pieces to provide gelled confection pieces having a shiny exterior surface.

24. The method of claim 21 wherein the topical applying step includes applying an insoluble calcium phosphate salt having a particle size of less than 150 microns to the gelled confection.

25. The method of claim 21 wherein the topical applying step forms a hard sugar shell on the gelled confection pieces.

26. The method of claim 18 wherein at least a portion of the fat is medium chain triglycerides.

27. The method of claim 26 wherein at least a portion of the medium chain triglycerides is supplied by canola oil.

28. The method of claim 1 wherein the gel forming base blend additionally comprises about 0.1% to about 10% fructo oligo saccharide.

29. The method of claim 18 wherein the gel forming base blend additionally comprises about 0.1% to about 10% fructo oligo saccharide.

30. The method of claim 1 wherein the gel forming base blend has a solids concentration of at least 81° Brix.

31. The method of claim 30 wherein the curing step has a duration of less than two hours.

32. The method of claim 30 wherein the curing step is less than 12 hours.

33. The method of claim 31 wherein the curing step removes moisture from the pieces.

34. The method of claim 18 further comprising subjecting the calcium slurry to a calcium particle size reduction step prior to admixing to the base blend.

* * * * *